(12) United States Patent
Alam et al.

(10) Patent No.: US 9,791,257 B1
(45) Date of Patent: Oct. 17, 2017

(54) DETERMINING A THICKNESS OF INDIVIDUAL LAYERS OF A PLURALITY OF METAL LAYERS

(71) Applicant: Amazon Technologies, Inc., Seattle, WA (US)

(72) Inventors: Mohammed Aftab Alam, San Jose, CA (US); Ramez Nachman, San Francisco, CA (US); David Eric Peters, San Jose, CA (US); John Espinoza Sanchez, Jr., Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 14/813,227

(22) Filed: Jul. 30, 2015

(51) Int. Cl.
*G01B 7/06* (2006.01)

(52) U.S. Cl.
CPC ............................... *G01B 7/06* (2013.01)

(58) Field of Classification Search
CPC ............................. G01B 7/00–7/066
USPC ............... 324/691, 693, 699, 713–717
See application file for complete search history.

(56) References Cited

U.S. PATENT DOCUMENTS 7,420,163 B2 * 9/2008 Schueler ............ G01B 15/02
324/702

* cited by examiner

*Primary Examiner* — Melissa Koval
*Assistant Examiner* — Rahul Maini
(74) *Attorney, Agent, or Firm* — Lee & Hayes, PLLC

(57) ABSTRACT

Techniques are described to determine a thickness of individual layers of a plurality of metal layers that include a first metal layer disposed on a polymer material and a second metal layer disposed on the first layer, such that the first layer is between the polymer material and the second layer. A measurement device may determine a resistance of the plurality of metal layers and calculate (e.g., estimate) a thickness of the individual layers based on the resistance of the individual layers and based on a resistivity of individual metals used in the plurality of metal layers. The measurement device may determine whether the individual thicknesses are within predetermined thickness ranges to determine whether to pass a quality control test.

20 Claims, 13 Drawing Sheets

DETERMINING A THICKNESS OF INDIVIDUAL LAYERS OF A PLURALITY OF METAL LAYERS

BACKGROUND

Consumer products may be assembled using multiple parts. Some of these parts may be plated (e.g., using electroplating or similar techniques) with one or more layers of metal. During manufacturing, a thickness of each of the metal layers may be determined for quality control purposes. For example, if a metal layer is too thin, the coated part may lack sufficient structural rigidity and may crack under normal use. If the metal layer is too thick, the coating may prevent the coated part from fitting properly with the other parts when the product is being assembled, making the product difficult to assemble or causing the product to fall apart after assembly due to ill-fitting parts.

Current non-destructive thickness measurement techniques, such as X-ray fluorescence (XRF) spectroscopy, may be suitable for accurately measuring thin layers, but may be incapable of accurately measuring metal layers that are thicker than a particular thickness. For example, XRF may be capable of measuring thicknesses up to 15 microns but may be incapable of measure thicknesses of 20 microns or more. In addition, current techniques may be capable of measuring the thickness of a single metal layer but incapable of determining the thickness of individual layers of multiple metal layers. Furthermore, techniques such as XRF may be relatively slow and therefore unsuited for mass produced components of a consumer product, such as a computing device.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
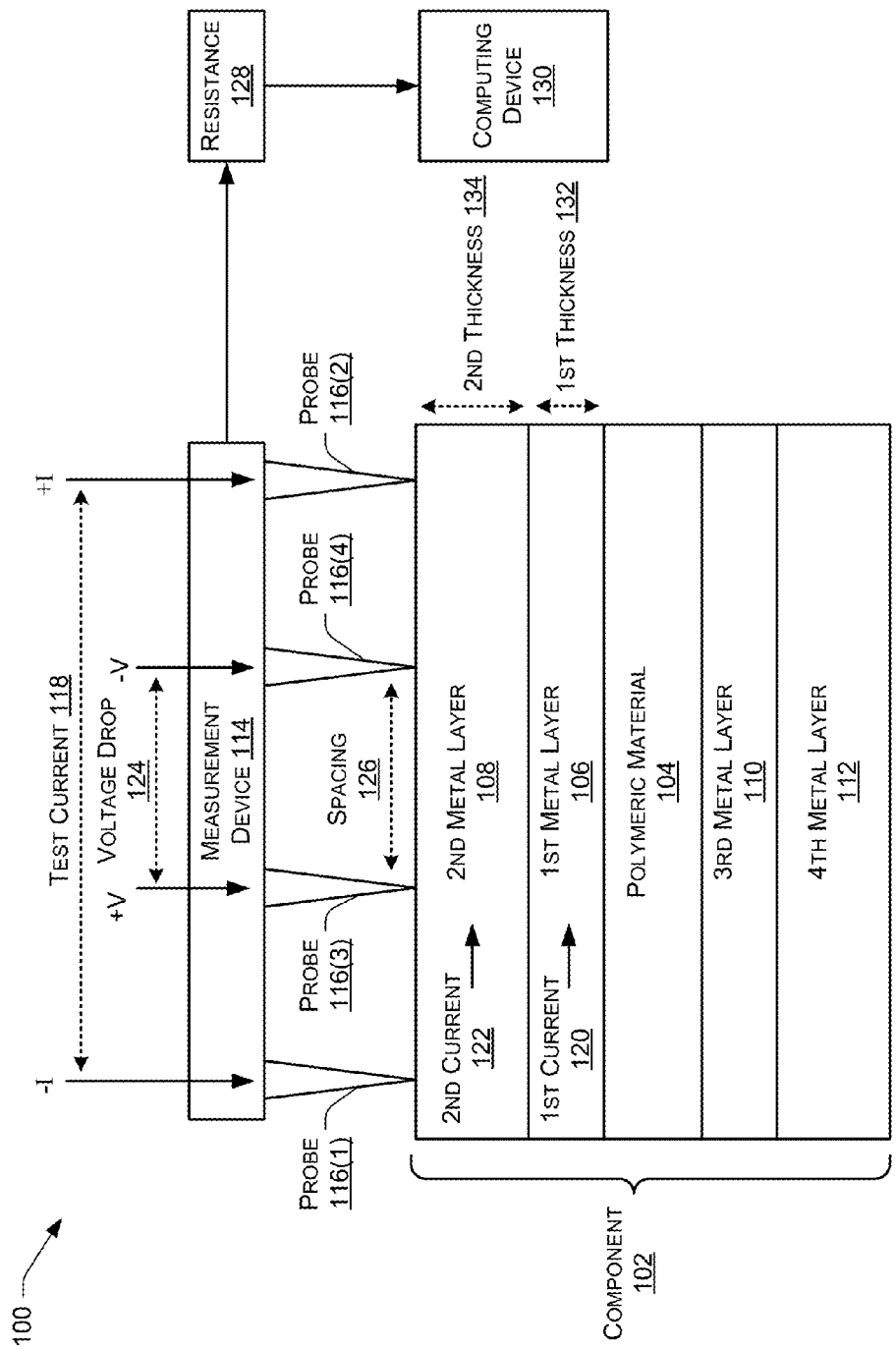
FIG. 1 is an illustrative system to determine a thickness of multiple metal coatings according to some implementations.

The systems and techniques described herein may be used to determine a thickness of multiple metal coatings that have been applied to a surface of a polymer material. For example, a component of a device may be electroplated with at least two metal coatings. To illustrate, a device (e.g., a tablet computing device, a wireless phone, or other type of device) may be assembled using multiple components. One of the multiple components, such as a back panel of a tablet computing device, may be electroplated with two or more metals to add electromagnetic shielding, to provide structural rigidity, to add another feature, or any combination thereof. For example, the component may be made out of polymer plastic (e.g., acrylonitrile butadiene styrene (ABS)) that is capable of being electroplated. The electroplated metal coatings may include a layer of copper and a layer of nickel. In some cases, the metal may be in a nanocrystalline form. For example, the nickel layer may be electroplated using nanocrystalline nickel or another similar material.

The systems and techniques described herein may be used to determine the thickness of the metal coating non-destructively and relatively quickly (e.g., within several seconds) to enable a large quantity of the component of the consumer device to be efficiently manufactured. The thickness of the metal coating may be determined at multiple locations in the component to determine whether the metal coating has been applied uniformly, e.g., to determine whether the thickness at multiple locations is within a predetermined thickness range.

The manufacturing process for the component may include pouring (or applying) polystyrene material into a die (e.g., mold). After the polystyrene material has cooled, the component may be removed from the die and electroplated with a first metal layer. After the first metal layer has dried, a second metal layer may be electroplated over the first metal layer, resulting in two metal layers. In some cases, one or more additional metal layers may be electroplated on top of the first two metal layers. After the multiple metal layers have been electroplated on the component, the thickness of the electroplating may be measured. To enable the thickness of the electroplating to be measured soon after the component has been electroplated, in some cases, one or more air nozzles may be used to dry one or more locations on the component where the thickness is to be measured. For example, the air nozzles may spray a gas (e.g., oxygen, nitrogen, or the like) or a gas mixture (e.g., air) to dry the locations where the thickness is to be measured. In some cases, the gas (or gas mixture) may be at a particular temperature (e.g. at room temperature or heated to a predetermined temperature) when the gas is directed to the locations where the thickness is to be measured.

A measurement device with multiple electrical probes may be placed on a top layer (e.g., the second metal coating when two coatings are applied) of the multiple metal coatings. The measurement device may be used to determine a total resistance of the multiple metal coatings. For example, one or more of the electrical probes may be used to pass an electrical current through a portion of the multiple metal coatings of the component. The measurement device may measure a voltage drop between two probes. The measurement device may determine a resistance of the multiple metal coatings based on the voltage drop. For example, the measurement device may use a four wire measurement (or similar) system to measure the voltage drop. The measurement device (or a separate computing device) may determine (e.g., estimate) a thickness of individual layers of the multiple metal coatings based on the total resistance. The measurement device (or a separate computing device) may determine whether the thickness of each of the individual layers of the multiple metal coatings is within a predetermined range to determine whether to pass or fail a quality control rating of the component. If the measurement device (or a separate computing device) determines that the total thickness of the multiple metal layers, the thickness of the individual metal layers, or both are within a predetermined range, the metal coatings of the component may be certified as having the correct thickness and the component may be used, along with other components, to assemble a device (e.g., a tablet computing device or another type of device). For example, the measurement device (or a separate computing device) may determine whether a thickness of the first metal coating is within a first range, whether a thickness of the second metal coating is within a second range, whether the total thickness of the multiple metal coatings is within a third range, or the like.

Thus, a component of a device may be made using a polymer-based material and electroplated to deposit two or more metal layers on a surface of the polymer material. A measurement device may apply a current through a portion of a surface of the component and measure a voltage drop of the metallic coatings when the current passes through the portion of the surface. In some cases, the measurement device may apply a voltage through a portion of a surface of the component and measure a current drop of the metallic coatings when the current passes through the portion of the surface. The voltage drop (or current drop) may be used to determine a resistance of the metallic coatings and the resistance may be used to determine the thickness of individual metallic coatings. The component may pass a quality control test if the thickness of individual metallic coatings, the total thickness of the multiple metallic coatings, or both, is within a predetermined range. In some cases, multiple metal layers may be electroplated on more than one surface of the component.

Determining a Thickness of Multiple Metal Coatings

FIG. 1 is an illustrative system 100 to determine a thickness of multiple metal coatings according to some implementations. A component 102 may be comprised of a polymeric material 104 with at least a first metal layer 106 and a second metal layer 108. For example, acrylonitrile butadiene styrene (ABS) material may be electroplated with a first layer of copper and a second layer of nanocrystalline nickel. Of course, based on the implementation, the component 102 may include another type of plateable material and other metals (e.g., besides copper and nickel) in the metal layers 106, 108. In some implementations, the component may include a third metal layer 110 and a fourth metal layer 112. For example, a component that functions as a back of a tablet may have the metal layers 106, 108 on one side (e.g., facing in when the tablet is assembled) and the metal layers 110, 112 on another side (e.g., facing in when the tablet is assembled). The metal used for the first metal layer 106 may be a same metal as the third metal layer 110 or a different metal. The metal used for the third metal layer 110 may be a same metal as the fourth metal layer 112 or a different metal. For example, in a particular implementation, the first metal layer 106 and the third metal layer 110 may include copper while the second metal layer 108 and the fourth metal layer 112 may include nanocrystalline nickel.

A measurement device 114 may include one or more electrically conductive probes 116. While four probes, e.g., probes 116(1), 116(2), 116(3) and 116(4), are illustrated in FIG. 1, other implementations may include more than four probes or fewer than four probes. The measurement device 114 may be placed such that the one or more probes 116 are placed in contact with a top layer of the metal coatings of the component 102. For example, as illustrated in FIG. 1, the probes 116(1), 116(2), 116(3) and 116(4) may be placed in contact with the second metal layer 108 (e.g., an outer layer). When measuring a thickness of the bottom layers 110, 112, the probes 116(1), 116(2), 116(3) and 116(4) may be placed in contact with the fourth metal layer 112. For example, the thickness of the bottom layers 110, 112 may be measured by (i) reversing an orientation of the component 102 such that the fourth metal layer 112 faces up (e.g., instead of down as in FIG. 1) and the second metal layer 108 faces down (e.g., instead of up) or (ii) using a second measurement device at the bottom of the component 102 with probes of the second measurement device facing up to contact the fourth metal layer 112.

When the measurement device 114 is placed on the component 102, the probes 116 may make an electrical contact with the second metal layer 108. The measurement device 114 may use a first set (e.g., one or more) of the probes 116 to apply a test current 118 into the metal layers 106, 108. For example, as show in FIG. 1, the test current 118 may be applied and may pass from the probe 116(1) to the probe 116(2). The test current 118 may cause a first current 120 in the first metal layer 106 and may cause a second current 122 in the second metal layer 108. The first current 120 may flow in the first metal layer 106 from about where the probe 116(1) is located to about where the probe 116(2) is located. The second current 122 may flow in the second metal layer 108 from about where the probe 116(1) is located to about where the probe 116(2) is located. The first current 120 may flow in parallel (e.g., substantially at the time) as the second current 122. For measurement purposes, the first metal layer 106 and the second metal layer 108 may be considered to be connected, in series with each other.

The measurement device 114 may use a second set (e.g., one or more) of the probes 116 to measure a voltage drop 124. For example, as shown in FIG. 1, the probe 116(3) and the probe 116(4) may be used to measure the voltage drop 124. Measuring the voltage drop 124 may result in the measurement being free from the effects of parasitic resistance of wires etc. In most cases, a distance between the probes 116(1) and 116(2) used to apply the test current 118 may be greater than a distance between the probes 116(3) and 116(4) used to measure the voltage drop 124. While the measurement device 114 is illustrated with four of the probes 116, in some cases, the measurement device 114 may use three of the probes 116, e.g., a first probe to apply the test current 118, a second probe to measure the voltage drop 124, and a third probe that is common (e.g., the third probe may be used for applying the test current 118 and for determining the voltage drop 124). For example, the third probe may be a ground cable (or negative cable) that is common to the first probe and the second probe. In addition, while the system 100 illustrates the measurement device 114 applying the test current 118 and measuring the voltage drop 124, in some implementations the measurement device 114 may apply a test voltage and measure a current drop.

A spacing 126 between two or more of the probes 116 (e.g., between the probe 116(3) and the probe 116(4)) may be significantly (e.g., an order of magnitude) greater than a thickness each of the layers 106, 108. For example, when a thickness of the first metal layer 106 is between about 5 microns and about 10 microns (e.g., where 'about' means plus or minus 15%), and a thickness of the second metal layer 108 is between about 25 and about 30 microns, the spacing 126 may be between about 1 millimeter (mm) and 1.5 mm.

The measurement device 114 may apply the test current 118, measure the voltage drop 124 associated with the multiple layers 106, 108, and determine a resistance 128 of the multiple layers 106, 108. The multiple layers 106, 108 may be considered to be connected in series with each other. A computing device 130 (or the measurement device 114) may determine a first thickness 138 associated with the first metal layer 106 and may determine a second thickness 140 associated with the second metal layer 108 based on the resistance 128.

In some cases, the computing device 130 may be integrated with (e.g., included in) the measurement device 114, while in other cases, the computing device 130 may be separate from the measurement device 114. The computing device 130, the measurement device 114, or both may perform the various calculations described herein.

A relationship between a thickness t of a metal layer and a resistance R of the metal layer may be expressed using the following equation:

$$t = \frac{C\rho \ln(2)}{\pi R}$$

where C is a calibration adjustment, $\rho$ is a resistivity of the material used in the metal layer, ln(2) is the natural logarithm of 2, and $\pi$ is approximately 3.14159. The calibration adjustment C may be determined by creating the component 102, e.g., coating the polymeric material 104 with at least the first metal layer 106 and the second metal layer 108, determining a cross-section of the component 102, measuring an actual thickness of each of the multiple layers 106, 108, and measuring a total resistance of the multiple layers 106, 108. The calibration adjustment C may be determined before producing a large quantity of the component 102.

The computing device 130 may determine individual thicknesses of multiple metal layers based on the resistance 128. For example, based on the resistance 128, the computing device 130 may determine a first thickness 132 of the first metal layer 106 and determine a second thickness 134 of the second metal layer 108.

If the first metal layer 106 comprises copper (Cu), then a relationship between $R_{Cu}$ (e.g., a resistance of the first metal layer 106) and the first thickness 132 may be expressed using the equation:

$$R_{Cu} = \frac{C_{Cu}\rho_{Cu}\log(2)}{\pi t_{Cu}}$$

where $C_{Cu}$ is the calibration adjustment for the Cu layer (e.g., the first metal layer 106), $\rho_{Cu}$ is a resistivity of the Cu layer, and $t_{Cu}$ is the thickness of the Cu layer (e.g., the first thickness 138).

If the second metal layer 108 comprises nanocrystalline nickel (Ni), then a relationship between $R_{Ni}$ (e.g., a resistance of the second metal layer 108) and the second thickness 134 may be expressed using the equation:

$$R_{Ni} = \frac{C_{Ni}\rho_{Ni}\log(2)}{\pi t_{Ni}}$$

where $C_{Ni}$ is the calibration adjustment for the Ni layer (e.g., the second metal layer 108), $\rho_{Ni}$ is a resistivity of the Ni layer, and $t_{Ni}$ is the thickness of the Ni layer (e.g., the second thickness 140).

In this example, e.g., when the first metal layer 106 comprises Cu and the second metal layer 108 comprises Ni, the relationship between the resistance 128 (e.g., $R_T$ in the equation) of the multiple layers 106, 108 and the thicknesses $t_{Cu}$ (e.g., the first thickness 132) and $t_{Ni}$ (e.g., the second thickness 134) may be expressed using the equation:

$$R_T = \frac{\log(2)/\pi}{\left(\frac{t_{Ni}}{C_{Ni}\rho_{Ni}}\right) + \left(\frac{t_{Cu}}{C_{Cu}\rho_{Cu}}\right)}$$

Based on this equation, and based on the resistance 128, the computing device 130 may determine the first thickness 132 and the second thickness 134. Of course, Ni and Cu are used merely as examples of two different metal layers that may be electroplated on a polymer material. The same equation may be modified to determine a thickness of other types of metal layers. For example, the following equation describes the relationship between a resistance of two metal layers X and Y and a thickness of each layer:

$$R_T = \frac{\log(2)/\pi}{\left(\frac{t_X}{C_X\rho_X}\right) + \left(\frac{t_Y}{C_Y\rho_Y}\right)}$$

(e.g., where X is the first metal layer 106 and Y is the second metal layer 108). By measuring the resistance 130, the first thickness 132 of the first metal layer 106 and the second thickness 134 of the second metal layer 108 may be determined. The above equation may be extended to determine individual thicknesses of more than two metal layers by adding an additional calculation for each additional layer. For example, if Z is an additional metal layer on top of the second metal layer 108, then the equation may be modified to include Z:

$$R_T = \frac{\log(2)/\pi}{\left(\frac{t_X}{C_X\rho_X}\right) + \left(\frac{t_Y}{C_Y\rho_Y}\right) + \left(\frac{t_Z}{C_Z\rho_Z}\right)}$$

where $t_Z$ is the thickness of the Z layer, $C_Z$ is the calibration adjustment for the Z layer, and $\rho_Z$ is the resistivity of the metal Z.

The thicknesses 132, 134 may be determined (e.g., estimated) at multiple locations of the component 102 to determine that the thickness of each of the multiple layers 106, 108 is relatively uniform across the component 102. For example, the thicknesses 132, 134 may be determined at about a dozen locations of the component 102. If the component 102 includes (i) the multiple layers 106, 108 on a first surface (e.g., top surface) of the polymeric material 104 and (ii) the multiple layers 110, 112 on a second surface (e.g., bottom surface) of the polymeric material 104, the thicknesses 132, 134 may be measured at about a dozen locations on the first surface and at about a dozen locations on the second surface. For example, to determine the thicknesses of the layers 106, 108 and to determine the thicknesses of the layers 110, 112, (1) the measurement device 114 may be used for the multiple layers 106, 108 and an additional measurement device may be used for the multiple layers 110, 112, (2) the component 102 may remain stationary while the measurement device 114 moves, e.g., the measurement device 114 may be placed in a first orientation (e.g., as illustrated in FIG. 1) to determine the multiple layers 106, 108 and then placed in a second orientation (e.g., flipped 180 degrees) to determine the multiple layers 110, 112, or (3) the component 102 may move while the measurement device 114 does not change in orientation, e.g., the measurement device 114 may determine the multiple layers 106, 108 in a first orientation (e.g., as illustrated in FIG. 1) and then the component 102 may be placed in a second orientation (e.g., flipped 180 degrees) to enable the measurement device 114 to determine the multiple layers 110, 112. Of course, these are merely examples of how the thicknesses of multiple layers on multiple surfaces may be determined and other implementations may use other techniques. Prior to using the equations to determine a thickness of each metal layer, a thickness of each layer may be measured (e.g., empirically measured). For example, the first metal layer 106 may be deposited on the polymeric material 104 and the first thickness 132 of the first metal layer 106 may be measured. The second metal layer 108 may be deposited on the first metal layer 106 and the second thickness 134 of the second metal layer 108 may be measured. For example, a precise measurement technique, such as a destructive measurement technique, may be used to measure the thicknesses 132, 134 before the resistance 128 is used to determine (e.g., estimate) the thicknesses 132, 134. In some cases, a test batch that includes a particular quantity of the components 102 with the multiple layers 106, 108 may be produced. For each component 102, the thicknesses 132, 134 may be measured at multiple locations for each of the multiple layers 106, 108 and the results collected to create statistical data. The statistical data (e.g., the thicknesses 132, 134 measured for a particular quantity of the component 102) may be analyzed to determine an acceptable thickness range for each of the multiple layers 106, 108 at each of the multiple locations where the resistance 128 is determined. For example, $-N*\sigma$ (where N is an integer greater than 1 and $\sigma$ is a standard deviation of the thicknesses 132, 134 in the statistical data) may be determined and used as a range to gauge whether a thickness of the multiple layers 106, 108 is acceptable (e.g., passes quality control) or unacceptable (e.g., fails quality control). The statistical data may be used to determine acceptable thickness ranges for relatively flat portions of the component 102 and for relatively curved (e.g., convex or concave) portions of the component 102.

Thus, the measurement device 114 may be placed on a top layer (e.g., the second metal layer 108) of multiple metal layers that have been electroplated on a surface of polymer material (e.g., the polymeric material 104). The measurement device 114 may apply a test current 118 that causes the first current 120 to flow in the first metal layer 106 and the second current 122 to flow in the second metal layer 108. The measurement device 114 may measure the voltage drop 124 to determine the resistance 128 of the multiple layers 106, 108. The computing device 130 may determine the first thickness 132 of the first metal layer 106 and the second thickness 134 of the second metal layer 108 based on the resistance 128 of the multiple layers 106, 108. In this way, the system 100 may use a non-destructive technique to quickly determine the thicknesses 132, 134 corresponding to the metal layers 106, 108, respectively. By doing so, a quality control of a component that is electroplated with multiple metal layers may be quickly performed, enabling large quantities of the component to be produced. The component and additional components may be used to assemble large quantities of a device, such as a computing device (e.g., cell phone, tablet device, or the like).

Figure 2:
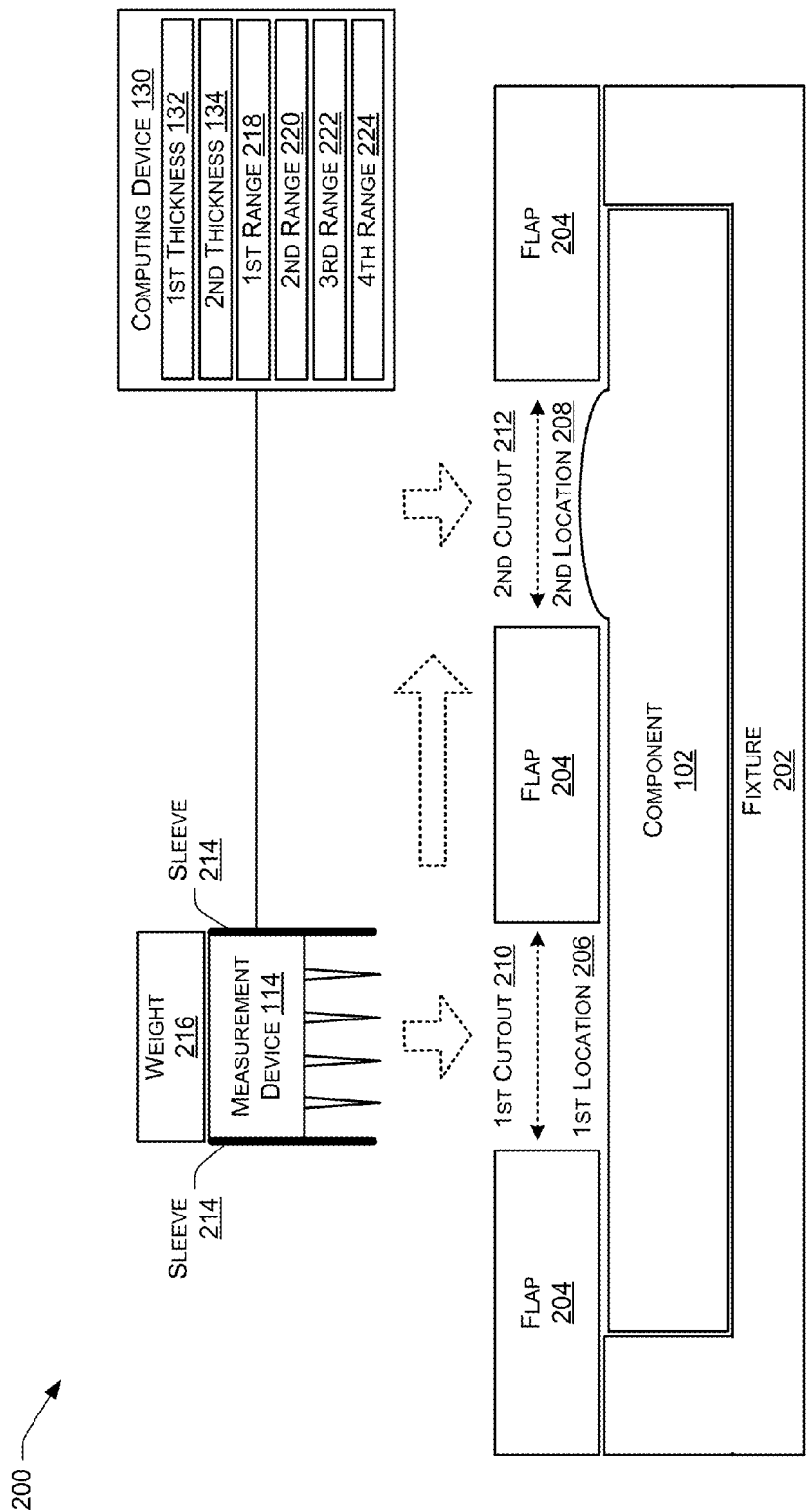
FIG. 2 is an illustrative system that includes a measurement device to determine a thickness of multiple metal coatings at multiple locations according to some implementations.

FIG. 2 is an illustrative system 200 that includes a measurement device to determine a thickness of multiple metal coatings at multiple locations according to some implementations. For example, the measurement device 114 may determine the first thickness 132 and the second thickness 134 at more than one location of the component 102.

To enable the measurement device 114 to determine the thicknesses 132, 134 at multiple locations on a surface of the component 102, the component 102 may be placed into a fixture 202 that holds the component 102 in a fixed orientation. For example, the fixture 202 may prevent the component 102 from moving when the measurement device 114 is used to determine the thicknesses 132, 134. As illustrated in FIG. 2, two (or more) sides of the fixture 202 may rise up to hold the component 102 in place.

The fixture 202 may include at least one flap 204 that can be raised (e.g., opened) to enable the component 102 to be placed in the fixture 202 and to enable the component 102 to be removed from the fixture 202. The flap 204 may be closed after the component 102 has been placed in the fixture 202 to enable the thicknesses 132, 134 to be measured at multiple locations. For example, the measurement device 114 may determine the thicknesses 132, 134 at least at a first location 206 and at a second location 208 on a surface of the component 102. The component 102 may include a location where a surface of the component 102 is relatively flat (e.g., as illustrated in FIG. 2 by the first location 206), a location where a surface of the component 102 is relatively curved (e.g., as illustrated in FIG. 2 by the second location 208), or both. For example, a curved portion of the component 102 may be convex (e.g., as illustrated in FIG. 2 by the second location 208) or concave. The curved portion of the component 102 may be located away from the edges of the component 102 (e.g., as illustrated in FIG. 2 by the second location 208) or may be located near or at the edges of the component 102. For example, one or more of the corners of the component 102 may be curved in one dimension or in two dimensions.

The flap 204 may include one or more cutouts at locations where the measurement device 114 is to be placed to determine the thicknesses 132, 134. For example, the flap 204 may include a first cutout 210 to enable the measurement device 114 to be placed in contact with the component 102 at the first location 206. The flap 204 may include a second cutout 212 to enable the measurement device 114 to be placed in contact with the component 102 at the second location 208.

In some cases, the measurement device 114 may be placed in a sleeve 214 used to guide (e.g., position) the measurement device 114 within the first cutout 210 or within the second cutout 212. A weight 216 may be placed on top of the measurement device 114 to enable the electrical probes (e.g., the probes 116 of FIG. 1) to make electrical contact with a top metal layer of the component 102.

To determine the thicknesses 132, 134, the flap 204 may be raised (e.g., opened), the component 102 placed in the fixture 202, and the flap 204 lowered (e.g., closed). The component 102 may be held by the fixture 202. The flap 204 may lay across a top surface of the component 102, as illustrated in FIG. 2. The flap 204 may remain in a lowered (e.g., closed) position until the measurement device 114 has determined the thicknesses 132, 134 at the first location 206 and at the second location 208.

Guided by the sleeve 214, the measurement device 114 may be lowered into the first cutout 210, the weight 216 may be placed on top of the measurement device 114, and the measurement device 114 may determine the thicknesses 132, 134 at the first location 206. The weight 216 may be temporarily removed from the measurement device 114 and the measurement device 114 may be removed from the first cutout 210. The sleeve 214 may be used to guide the measurement device 114 into the second cutout 212, the weight 216 may be placed on top of the measurement device 114, and the measurement device 114 may determine the thicknesses 132, 134 at the second location 208.

The process of placing the measurement device 114 in a cutout of the flap 204 and determine the thicknesses 132, 134 at a location of the component 102 may be repeated until the measurement device 114 has determined the thicknesses 132, 134 at each of the locations where measurements are to be performed. After determining the thicknesses 132, 134 at multiple locations, the flap 204 may be raised (e.g., opened) and the component 102 may be removed from the fixture 202. For example, the component 102 may be used, along with other components, to assemble a device, such as a computing device. If a second component is to be tested, the second component may be placed in the fixture 202, and the process of placing the measurement device 114 in each of the cutouts of the flaps 208 to determine the thicknesses 132, 134 at multiple locations on the surface of the second component may be repeated.

To determine whether the thicknesses 132, 134 of the component 102 are sufficiently thick to pass a quality control test, for each location where the thicknesses 132, 134 are measured, each of the thicknesses 132, 134 may be compared to an acceptable range. For example, a determination may be made whether the thickness 132 at the first location 206 is within a first (thickness) range 218 and a determination may be made whether the thickness 134 at the first location 206 is within a second (thickness) range 220. The first range 218 and the second range 220 may be determined based on a statistical analysis of measurements performed on a sample (e.g., a predetermined quantity) of the component 102. Similar determinations made be performed for the thicknesses at each of the locations 206, 208. In some cases, the acceptable thickness ranges may be different at each of the locations 206, 208. For example, a determination may be made whether the thickness 132 at the second location 208 is within a third range 222 and a determination may be made whether the thickness 134 at the second location 208 is within a fourth range 224. In some cases, the first range 218 may be the same as the third range 222 while in other cases the first range 218 may be different from the third range 222. The second range 220 may be the same as the fourth range 224 while in other cases the second range 220 may be different from the fourth range 224.

Figure 3:
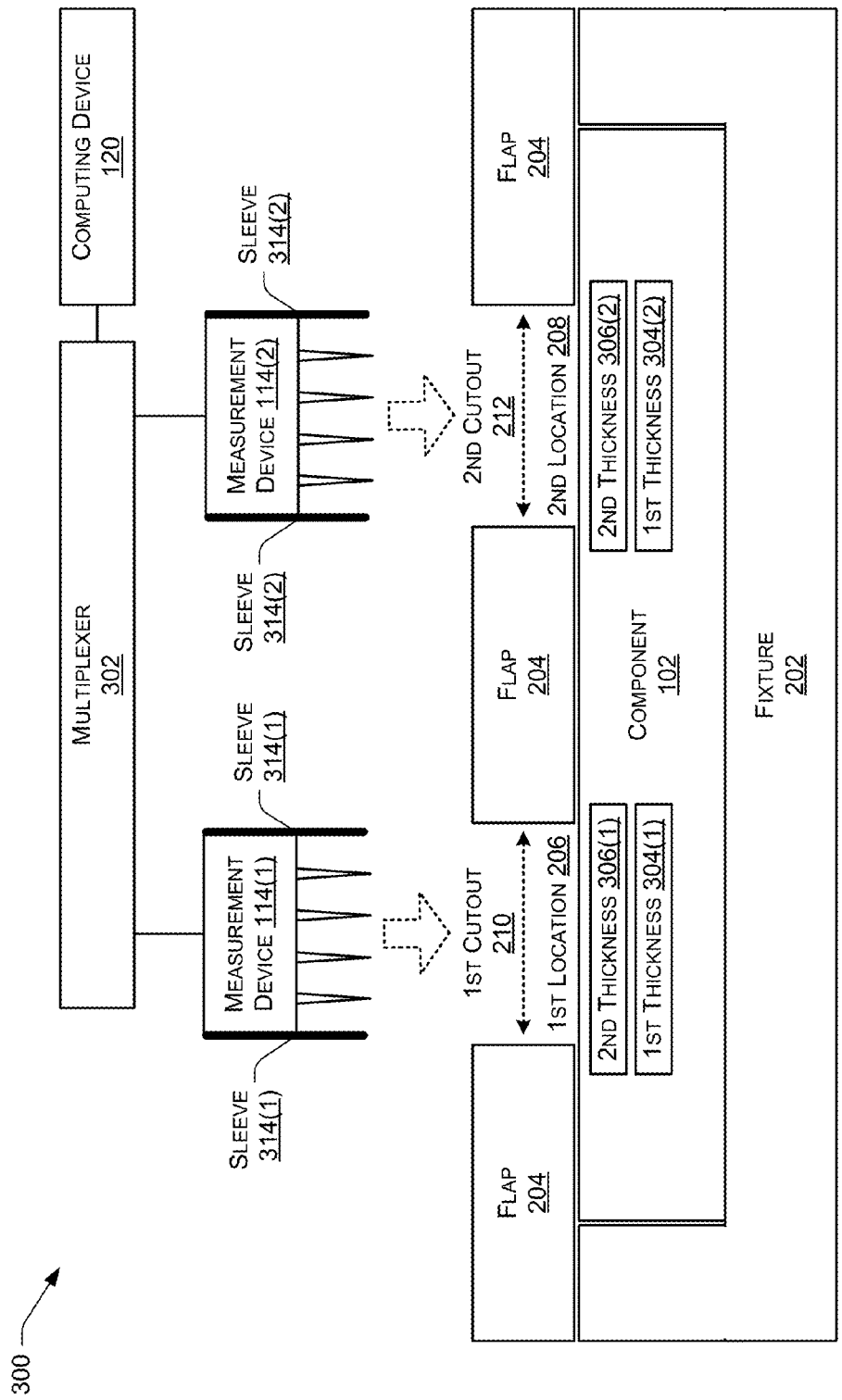
FIG. 3 is an illustrative system that includes multiple measurement devices to determine a thickness of multiple metal coatings at multiple locations according to some implementations.

FIG. 3 is an illustrative system 300 that includes multiple measurement devices to determine a thickness of multiple metal layers (e.g., coatings) at multiple locations according to some implementations. In some implementations, two or more measurement devices, such as the measurement device 114(1) and the measurement device 114(2), may be used to perform measurements substantially at the same time (e.g., in parallel) at two or more locations of the component 102.

For example, the flap 204 may be raised (e.g., opened), the component 102 placed in the fixture 202, and the flap 204 lowered (e.g., closed). The component 102 may be held by the fixture 202 and the flap 204 may lay across a top surface of the component 102, as illustrated in FIG. 2. The flap 204 may remain in a lowered (e.g., closed) position until the measurement device 114 has performed the measurements 202 at each of the locations 204, 206.

The measurement device 114(1) may be lowered into the first cutout 210 at substantially the same time that the measurement device 114(2) is lowered into the second cutout 212. In some cases, a weight (e.g., the weight 216 of FIG. 2) may be placed on top of each of the measurement devices 114(1) and 114(2). A multiplexer 302 may be used to select individual ones of the measurement devices 114(1), 114(2) to perform measurements such that at any given point in time, one of the measurement devices 114(1), 114(2) performs a measurement. The multiplexer 302 may thus prevent two (or more) of the measurement devices 114(1), 114(2) from applying current (to measure a voltage drop) at two or more locations simultaneously. For example, the multiplexer 302 may cause the measurement device 114(1) to determine a first thickness 304(1) (e.g., associated with the first metal layer 106 of FIG. 1) and a second thickness 306(1) (e.g., associated with the second metal layer 108) at the first location 206 at a first point in time and cause the measurement device 114(2) to determine a first thickness 304(2) (e.g., associated with the first metal layer 106) and a second thickness 306(2) (e.g., associated with the second metal layer 108) at the second location 208 at a second point in time that is non-overlapping with the first point in time.

In some cases, the number of measurement devices may correspond to the number of cutouts in the flap 204. For example, the system 200 may include two measurement devices and two cutouts. In such cases, after the measurement devices 114(1), 114(2) determine thicknesses at the locations 204, 206, the flap 204 may be opened, the component 102 removed, and a second component placed in the fixture 202. The flap 204 may be closed and the measurement device 114(1) may be lowered into the first cutout 210 while the measurement device 114(2) is being lowered into the second cutout 212. The measurement devices 114(1), 114(2) may determine thicknesses at the locations 204, 206, the flap 204 may be opened, the second component removed and the process repeated for a third component, a fourth component, and so on.

In other cases, the number of measurement devices may be fewer than the number of cutouts in the flap 204. For example, the system 200 may include two measurement devices and four cutouts. In such cases, after thicknesses are determined at the locations 204, 206, the measurement devices 114(1), 114(2) may be moved from the locations 204, 206 and placed into two different locations of the component 102 to determine additional thicknesses. The flap 204 may be opened, the component 102 removed, a second component placed in the fixture 202, and the process may be repeated.

Figure 4:
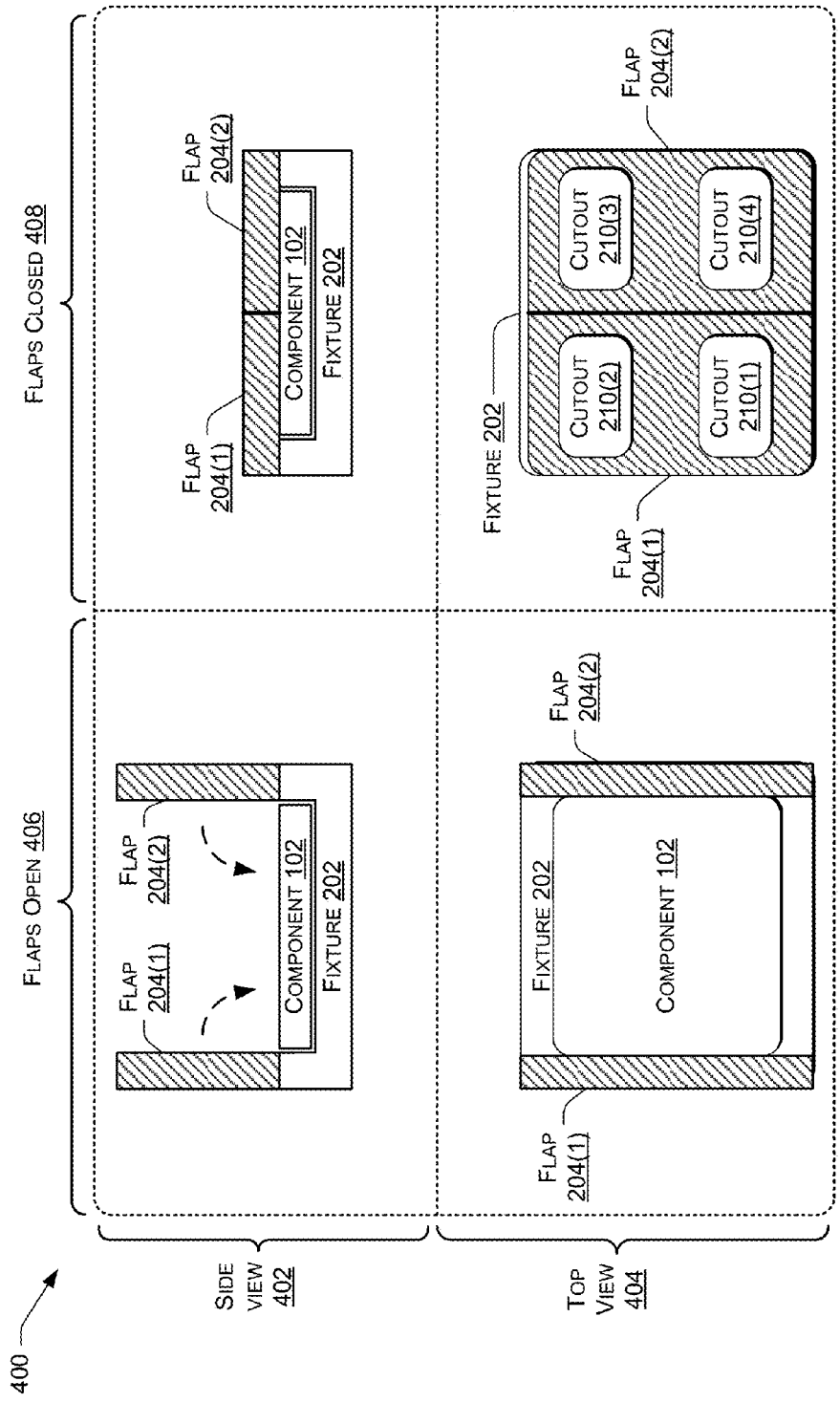
FIG. 4 is an illustrative system that includes a fixture to hold a component according to some implementations.

FIG. 4 is an illustrative system 400 that includes a fixture to hold a component according to some implementations. The system 400 illustrates a side view 402 and a top view 404 in a flaps open 406 configuration and a flaps closed 408 configuration. The system 400 illustrates the fixture 202 with two flaps, e.g., the flap 204(1) and the flap 204(2). The flap 203(1) is shown with two cutouts, e.g., the cutout 210(1) and the cutout 210(2). The flap 203(2) is shown with two cutouts, e.g., the cutout 210(3) and the cutout 210(4). To test more locations of the component 102, more than four cutouts may be used.

Figure 5:
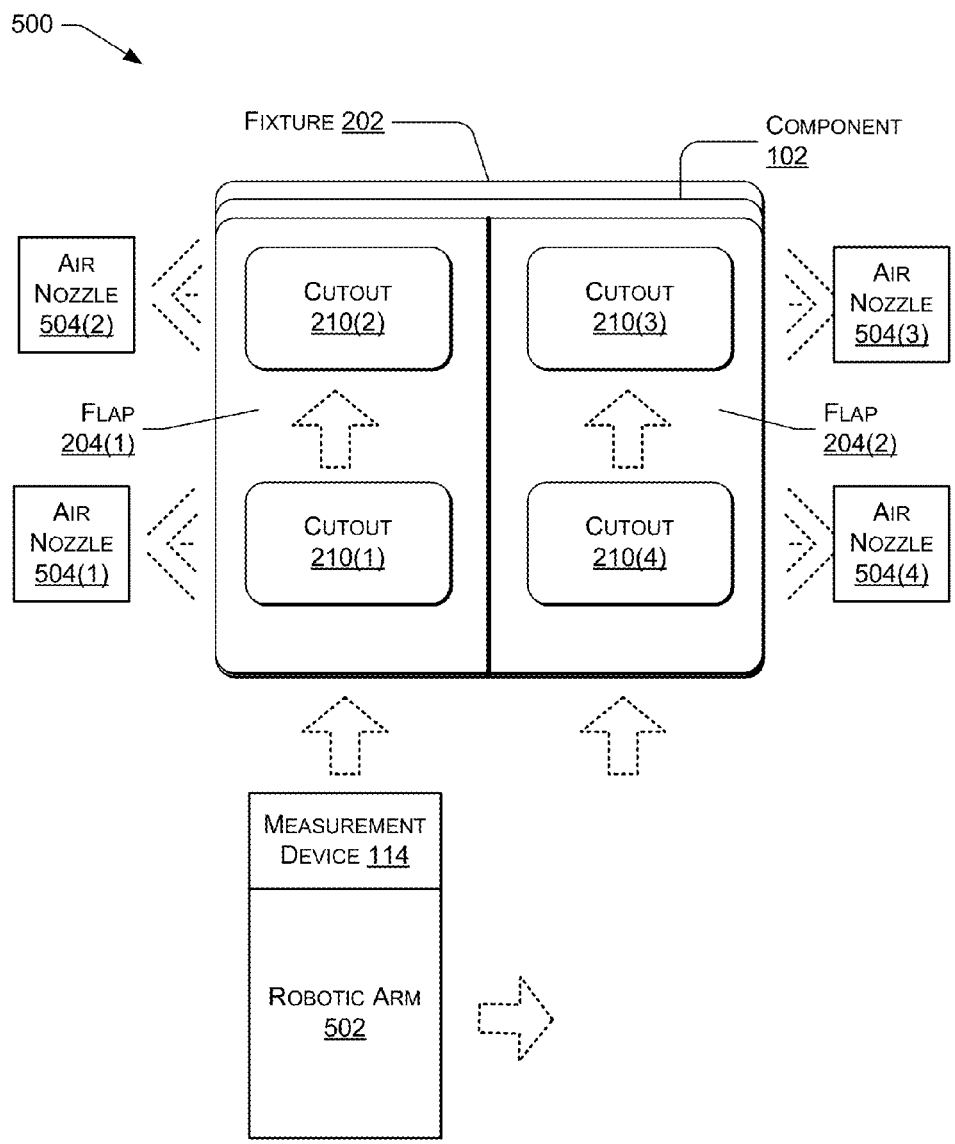
FIG. 5 is an illustrative system that includes a robotic arm with a measurement device to determine a thickness of multiple metal coatings at multiple locations according to some implementations.

FIG. 5 is an illustrative system 500 that includes a robotic arm with a measurement device to determine a thickness of multiple metal coatings at multiple locations according to some implementations. The system 500 illustrates how a robotic arm 502 may be used to move and place the measurement device 114 in multiple cutouts, e.g., in the cutout 210(1), in the cutout 210(2), in the cutout 210(3), and in the cutout 210(4).

After an outer metal layer (e.g., the second metal layer 108 of FIG. 1 when the component 102 has two metal layers) has been electroplated, rather than waiting for the outer metal layer to dry before determining the thickness of each metal layer, an air nozzle may be used to dry the outer metal layer to enable the measurement device 114 to determine thicknesses of each metal layer at each of the cutouts 210(1), 210(2), 210(3), and 210(4). For example, an air nozzle 504(1) may be positioned to spray air at a particular temperature (e.g., room temperature or heated to a particular temperature) at the cutout 210(1), an air nozzle 504(2) may be positioned to spray air at the particular temperature at the cutout 210(2), an air nozzle 504(3) may be positioned to spray air at the particular temperature at the cutout 210(3), and an air nozzle 504(4) may be positioned to spray air at the particular temperature at the cutout 210(4).

In the system 500, the robotic arm 502 may move the measurement device 114 to each of the cutouts 210(1), 210(2), 210(3), and 210(4) to determine a thickness of each metal layer at the corresponding locations. Before the robotic arm 502 moves the measurement device 114 to a particular one of the cutouts 210(1), 210(2), 210(3), or 210(4), the corresponding one of the air nozzles 504(1), 504(2), 504(3), or 504(4) may spray a gas (or a gas mixture) at the particular temperature for a predetermined period of time (e.g., a time period that has previously been determined as sufficient to enable the outer metal layer to be dry for the purposes of measuring the thicknesses of the metal layer). For example, before the robotic arm 502 moves the measurement device 114 to the cutout 210(1), the air nozzle 504(1) may spray a gas (or a gas mixture) at the particular temperature for the predetermined period of time such that the outer metal layer is dry when the robotic arm 502 places the measurement device 114 in the cutout 210(1). Similarly, before the robotic arm 502 moves the measurement device 114 to the cutout 210(2), the air nozzle 504(2) may spray a gas (or a gas mixture) at the particular temperature for the predetermined period of time, and so on.

Figure 6:
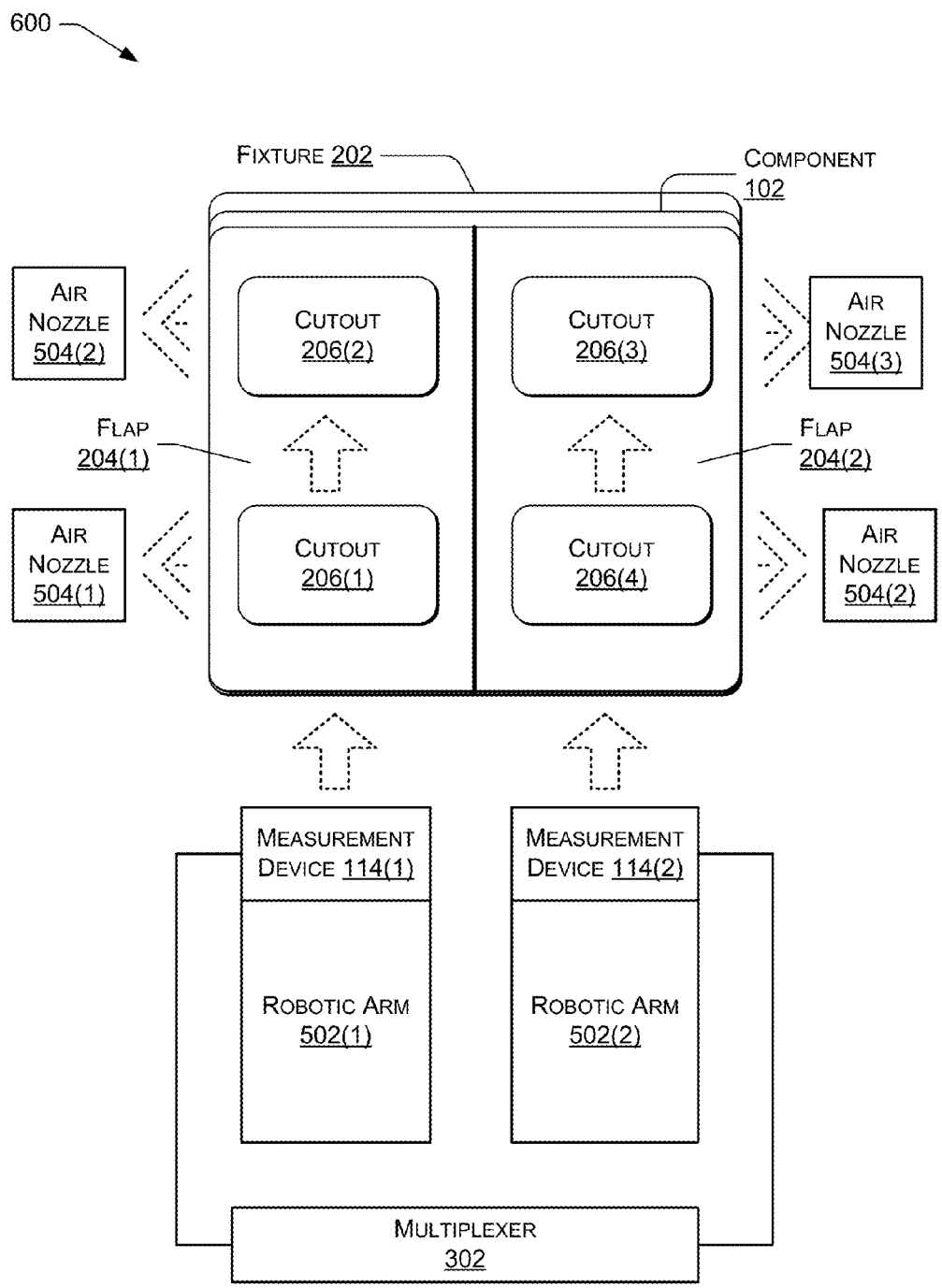
FIG. 6 is an illustrative system that includes multiple robotic arms with measurement devices capable to determine a thickness of multiple metal coatings at multiple locations according to some implementations.

FIG. 6 is an illustrative system 600 that includes multiple robotic arms with measurement devices capable to determine a thickness of multiple metal coatings at multiple locations according to some implementations. In the system 600 there are fewer measurement devices than there are cutouts.

The system 600 illustrates how multiple measurement devices 114(1), 114(2) may be moved substantially at the same time (e.g., in parallel) to measure multiple cutouts. For example, the robotic arm 502(1) may move the measurement device 114(1) to the cutout 206(1) at substantially the same time that the robotic arm 502(2) moves the measurement device 114(2) to the cutout 206(4). After the robotic arms 502(1) and 502(2) have positioned the measurement devices 502(1) and 502(2) in the cutouts 206(1) and 206(4), respectively, the multiplexer 302 may cause the measurement devices 114(1) and 224(2) to, one after another, apply a current, measure the voltage drop, determine a resistance of the multiple metal layers, and determine a thickness of individual layers of the multiple metal layers (e.g., as described herein). For example, the multiplexer 302 may cause the measurement device 114(1) to determine the thicknesses of the individual metal layers at the cutout 206(1) and then, after the thicknesses of the individual metal layers have been determined at the cutout 206(1), the multiplexer 302 may cause the measurement device 114(2) to determine the thicknesses of the individual metal layers at the cutout 206(4).

The robotic arm 502(1) may move the measurement device 114(1) to the cutout 206(2) at substantially the same time that the robotic arm 502(2) moves the measurement device 114(2) to the cutout 206(3). The multiplexer 302 may cause the measurement device 114(1) to determine the thicknesses of the individual metal layers at the cutout 206(2) and then, after the thicknesses of the individual metal layers have been determined at the cutout 206(2), the multiplexer 302 may cause the measurement device 114(2) to determine the thicknesses of the individual metal layers at the cutout 206(3).

Each of the air nozzles 504(1), 504(2), 504(3), and 504(4) may spray gas (or a gas mixture) to dry a portion of the outer metal layer before a measurement device is placed in a cutout. For example, the air nozzle 504(1) may spray a gas (or a gas mixture) at the predetermined temperature for the predetermined period of time to dry a first portion of the outer metal layer before the robotic arm 502(1) moves the measurement device 114(1) to the cutout 206(1), the air nozzle 504(2) may spray a gas (or a gas mixture) at the predetermined temperature for the predetermined period of time to dry a second portion of the outer metal layer before the robotic arm 502(2) moves the measurement device 114(2) to the cutout 206(4), and so on.

Figure 7:
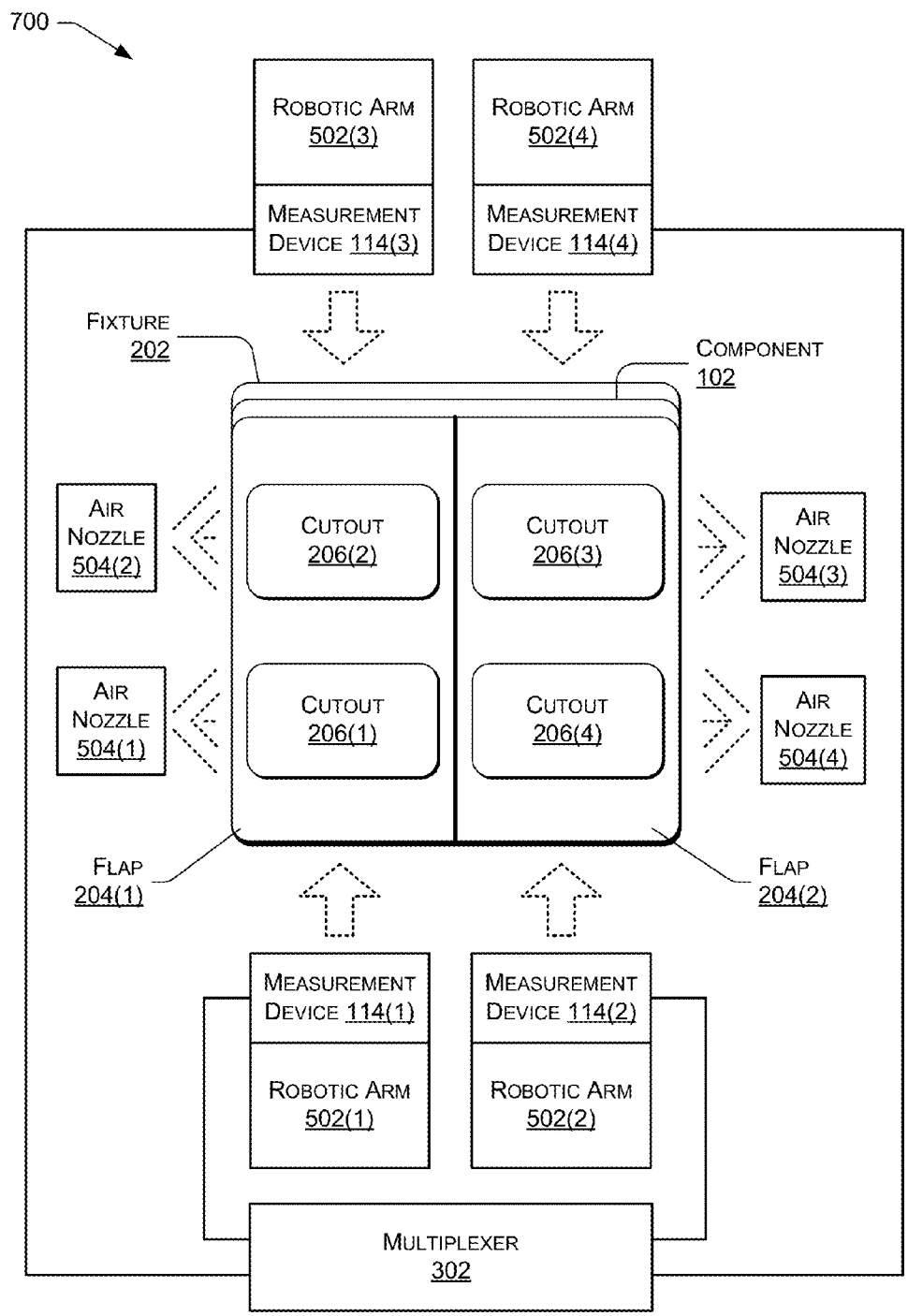
FIG. 7 is an illustrative system that includes at least one air nozzle according to some implementations.

FIG. 7 is an illustrative system 700 that includes at least one air nozzle according to some implementations. In the system 700 there are as many measurement devices as there are cutouts. The system 700 illustrates how multiple measurement devices 114(1), 114(2), 114(3), and 114(4) may be placed in multiple cutouts to enable the thickness of individual layers of multiple metal layers to be measured substantially simultaneously. For example, the robotic arm 502(1) may move the measurement device 114(1) to the cutout 206(1) at substantially the same time that the robotic arm 502(2) moves the measurement device 114(2) to the cutout 206(4), the robotic arm 502(3) moves the measurement device 114(3) to the cutout 206(2), and the robotic arm 502(4) moves the measurement device 114(4) to the cutout 206(3).

After the robotic arms 502(1), 502(2), 503(3), 504(4) have positioned the measurement devices 114(1), 114(2), 114(3), and 114(4) in the cutouts 206(1), 206(4), 206(2), 306(3), respectively, the multiplexer 302 may cause the measurement devices 114(1), 114(2), 114(3), and 114(4) to, one after another, apply a current, measure the voltage drop, determine a resistance of the multiple metal layers, and determine a thickness of individual layers of the multiple metal layers (e.g., as described herein). For example, the multiplexer 302 may cause the measurement device 114(1) to determine the thicknesses of the individual metal layers at the cutout 206(1) and, after the thicknesses of the individual metal layers have been determined at the cutout 206(1), the multiplexer 302 may cause the measurement device 114(2) to determine the thicknesses of the individual metal layers at the cutout 206(4). After the thicknesses of the individual metal layers have been determined at the cutout 206(4), the multiplexer 302 may cause the measurement device 114(3) to determine the thicknesses of the individual metal layers at the cutout 206(2). After the thicknesses of the individual metal layers have been determined at the cutout 206(2), the multiplexer 302 may cause the measurement device 114(4) to determine the thicknesses of the individual metal layers at the cutout 206(3).

Example Processes

Figure 8:
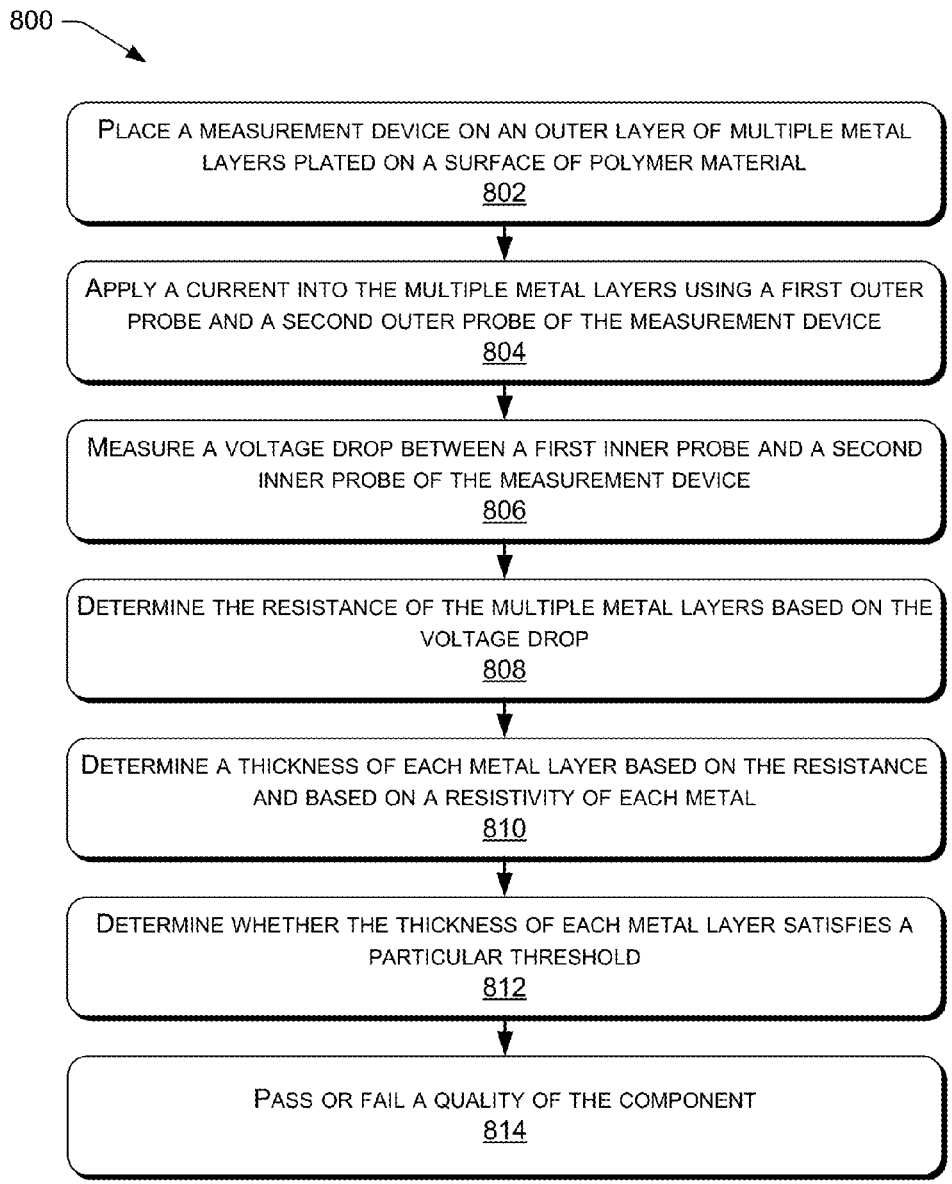
FIG. 8 is a flow diagram of an example process that includes applying a current into metal coatings according to some implementations.
Figure 9:
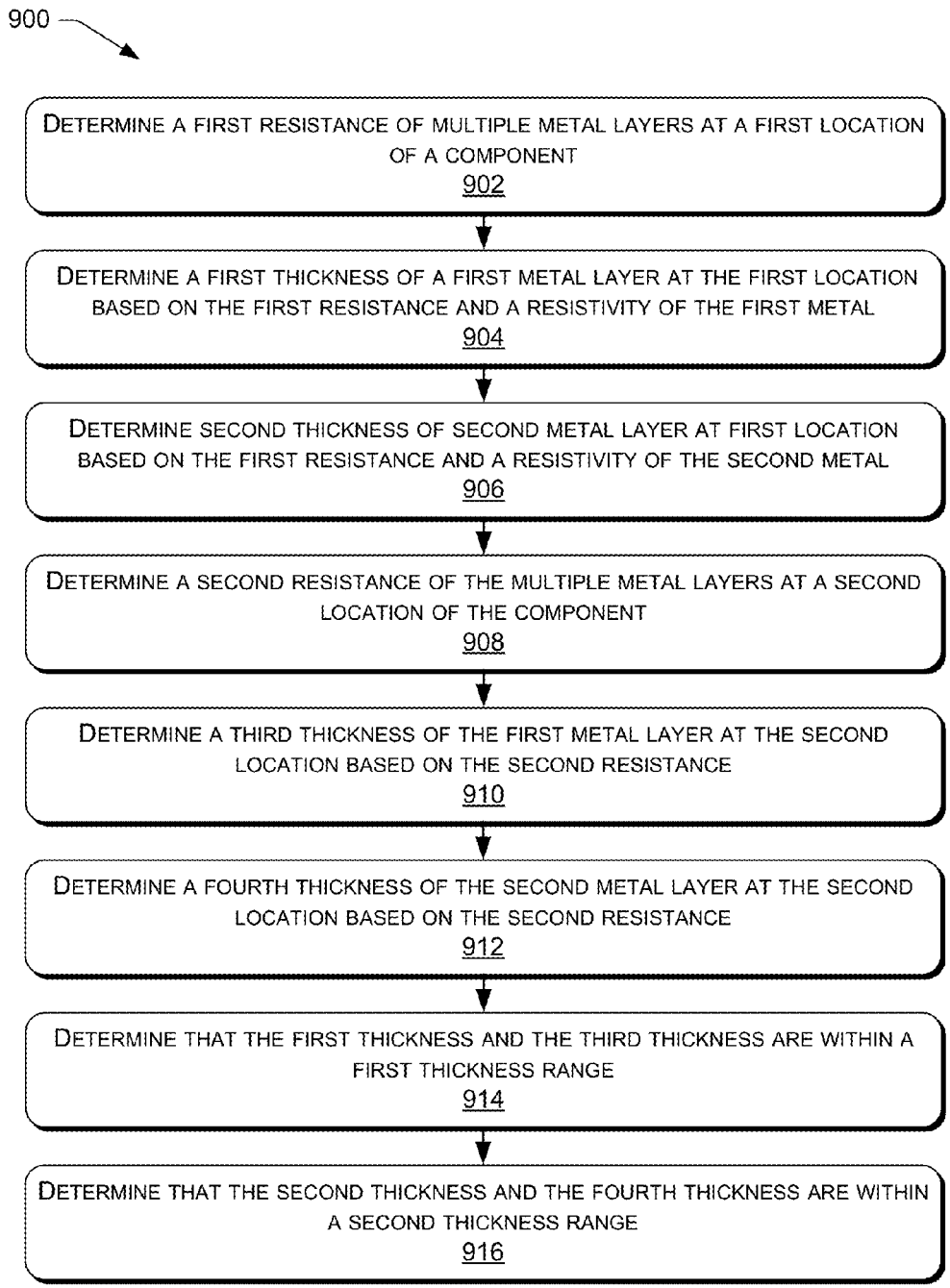
FIG. 9 is a flow diagram of an example process that determining a resistance of a metal coating at a location according to some implementations.
Figure 10:
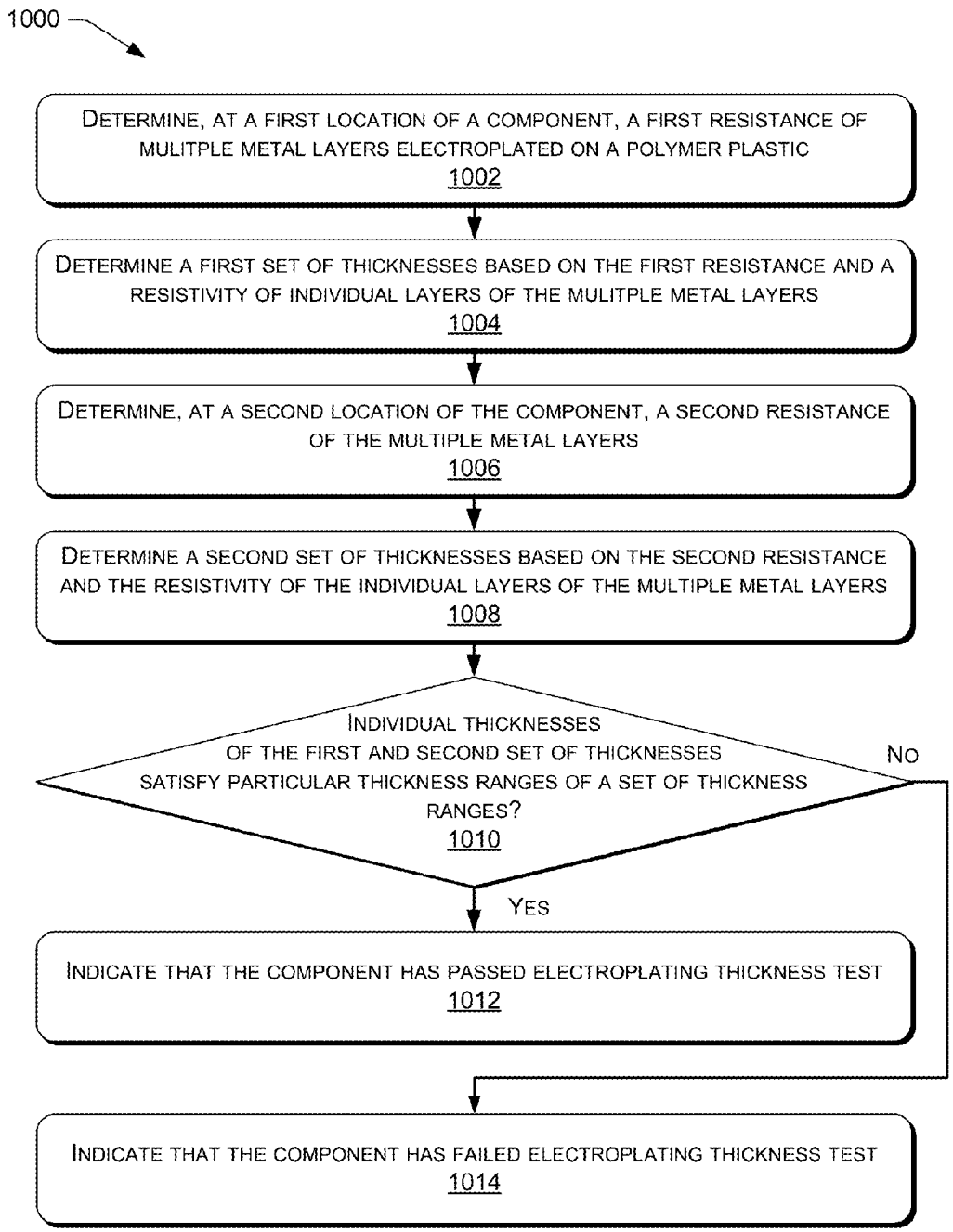
FIG. 10 is a flow diagram of an example process that includes determining a voltage drop across a portion of a metal coating according to some implementations.

In the flow diagrams of FIGS. 8, 9, and 10, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 800, 900, and 1000 are described with reference to the systems 100, 200, 300, 400, 500, 600, and 700 as described above, although other models, frameworks, systems and environments may implement these processes.

FIG. 8 is a flow diagram of an example process 800 that includes applying a current into metal coatings according to some implementations. The process 800 may be performed by the measurement device 114, the computing device 130, or both.

At 802, a measurement device may be placed on an outer layer of multiple metal layers plated on a surface of a polymer material. At 804, a current may be applied (e.g., using a power supply or other power source) into the multiple metal layers using a first outer probe and second outer probe of the measurement device. At 806, a voltage drop between a first inner probe and a second inner probe of the measurement device may be measured. At 808, a resistance of the multiple metal layers may be determined based on the voltage drop, or both. For example, in FIG. 1, the measurement device 114 may be placed on a top of a surface of the component 102. The measurement device 114 may apply the test current 118 using the probes 116(1), 116(4), measure the voltage drop 124 using the probes 116(2), 116(3), and determine the resistance 128 of the multiple layers 106, 108 based on the voltage drop 124.

At 810, a thickness of individual metal layers of the multiple metal layers may be determined based on (i) the resistance of the multiple metal layers and (ii) a resistivity of each metal. For example, as described above, the equation that describes the relationship between the total resistance of the multiple metal layers, the resistivity of the metal of each layer, and the thickness of each metal layer. To illustrate, the resistance 128 may be used to determine the first thickness 132 of the first metal layer 106 and the second thickness 134 of the second metal layer 108.

At 812, a determination is made as to whether the thickness of each metal layer satisfies a particular threshold (e.g., within particular range of values). At 814, a determination is made whether to pass or fail a quality of the component. For example, in FIG. 1, the computing device 130 may determine whether the first thickness 132 is between about 5 microns to about 10 microns and whether the second thickness 134 is between about 22 microns to about 28 microns. If a thickness of at least one metal layer does not satisfy the particular threshold (e.g., at least one metal layer is either too thin or too thick) then the component 102 may not pass quality control, and may not be assembled with other components to create a device. If a thickness of each metal layer satisfies a particular threshold (e.g., the first metal layer 106 is within a first threshold range and the second metal layer 108 is within a second threshold range) then the component 102 may pass quality control, and may be assembled with other components to create a device.

FIG. 9 is a flow diagram of an example process 900 that determining a resistance of a metal coating at a location according to some implementations. The process 900 may be performed by the measurement device 114, the computing device 130, or both.

At 902, a first resistance of multiple metal layers of a component may be determined at a first location. At 904, a first thickness of a first metal layer at the first location may be determined based on the first resistance and a resistivity of the first metal. At 906, a second thickness of a second metal layer at the first location may be determined based on the first resistance and a resistivity of the second metal. For example, in FIG. 3, the measurement device 114(1) may determine a resistance at the first location 206 and determine the first thickness 304(1) of a first metal layer and the second thickness 306(1) of a second metal layer at the first location 206.

At 908, a second resistance of multiple metal layers of a component may be determined at a second location. At 910, a third thickness of the first metal layer at the second location may be determined based on the second resistance and the resistivity of the first metal. At 912, a fourth thickness of the second metal layer at the second location may be determined based on the second resistance and the resistivity of the second metal. For example, in FIG. 3, the measurement device 114(2) may determine a resistance at the second location 208 and determine the first thickness 304(2) of a first metal layer and the second thickness 306(2) of a second metal layer at the second location 208.

At 914, a determination is made whether the first thickness and the third thickness (e.g., of the first metal layer) are within a first thickness range. At 916, a determined is made whether the second thickness and the fourth thickness (e.g., of the second metal layer) are within a second thickness range. For example, if the computing device 120 determines that the first thicknesses 304(1), 304(2) are within a first thickness range (e.g., about 5 to about 10 microns) and determines that the second thicknesses 306(1), 306(2) are within a second thickness range (e.g., about 25 to about 30 microns), then the computing device 120 may indicate that the electroplating of the component 102 has passed quality control. If the computing device 120 determines that at least one of the thicknesses 304(1), 304(2), 306(1), 306(2) is not within a particular thickness range, then the computing device 120 may indicate that the electroplating of the component 102 has failed quality control.

FIG. 10 is a flow diagram of an example process 1000 that includes determining a voltage drop across a portion of a metal coating according to some implementations. The process 1000 may be performed by the measurement device 114, the computing device 130, or both.

At 1002, a first resistance of multiple metal layers is determined at a first location of a component comprising a polymer plastic that is electroplated with the multiple metal layers. At 1004, a first set of thickness may be determined based on the first resistance and a resistivity of individual layers of the multiple metal layers. For example, in FIG. 3, the measurement device 114(1) may determine a resistance at the first location 206 and determine a first set of thicknesses, including the first thickness 304(1) of a first metal layer and the second thickness 306(1) of a second metal layer at the first location 206.

At 1006, a second resistance of the multiple metal layers is determined at a second location of the component. At 1008, a second set of thickness may be determined based on the second resistance and a resistivity of individual layers of the multiple metal layers. For example, in FIG. 3, the measurement device 114(2) may determine a resistance at the second location 208 and determine a second set of thicknesses, including the first thickness 304(2) of a first metal layer, and the second thickness 306(2) of a second metal layer at the second location 208.

At 1010, a determination is made whether individual thicknesses of the first set of thicknesses and the second set of thicknesses satisfy particular thickness ranges. If a determination is made, at 1010, that (e.g., "yes") individual thicknesses of the first set of thicknesses and the second set of thicknesses satisfy the particular thickness ranges, then the process proceeds to 1012 where an indication that the component has passed an electroplating thickness test is provided. If a determination is made, at 1010, that (e.g., "no") at least one individual thicknesses of the first set of thicknesses or of the second set of thicknesses does not satisfy one of the particular thickness ranges, then the process proceeds to 1014 where an indication that the component has failed an electroplating thickness test is provided. For example, if the computing device 120 determines that the first thicknesses 304(1), 304(2) are within a first thickness range (e.g., about 5 to about 10 microns) and determines that the second thicknesses 306(1), 306(2) are within a second thickness range (e.g., about 25 to about 30 microns), then the computing device 120 may indicate that the component 102 has passed an electroplating thickness test. If the computing device 120 determines that at least one of the thicknesses 304(1), 304(2), 306(1), 306(2) is not within a particular thickness range, then the computing device 120 may indicate that the component 102 has failed an electroplating thickness test.

Figure 11:
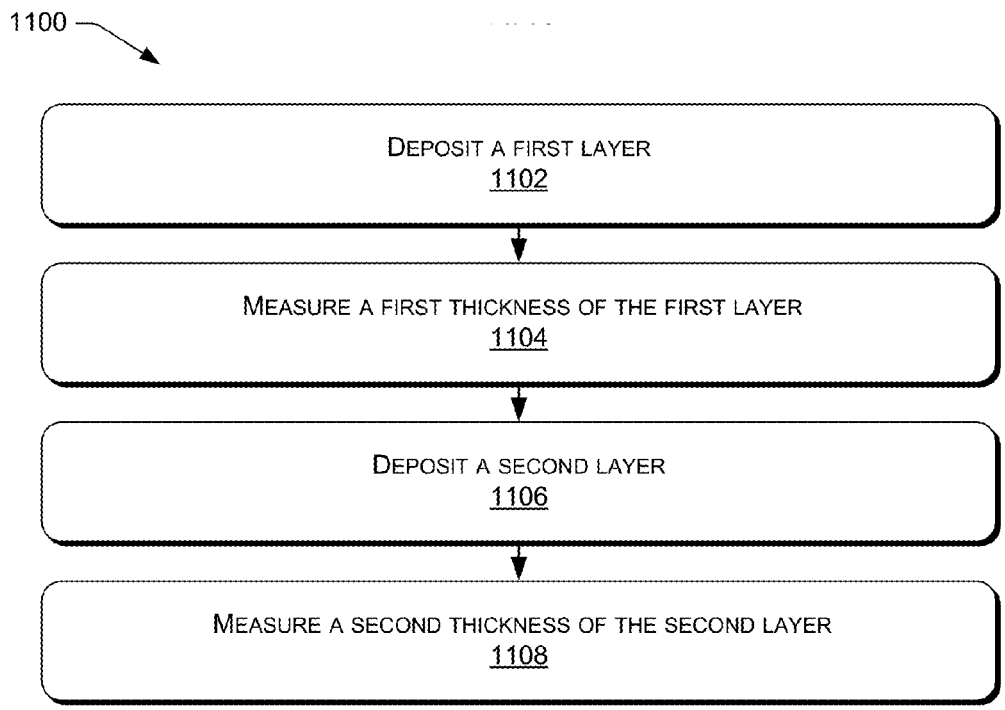
FIG. 11 is a flow diagram of an example process that includes measuring a thickness of a first layer and a second layer according to some implementations.

FIG. 11 is a flow diagram of an example process 1100 that includes measuring a thickness of a first layer and a second layer according to some implementations. The process 1100 may be performed by the measurement device 114, the computing device 130, or both.

At 1102, a first layer is deposited (e.g., on a surface of a component). At 1104, a first thickness of the first layer may be measured. At 1106, a second layer may be deposited (e.g., on top of the first layer). At 1108, a second thickness of the second layer may be measured. For example, a set (e.g., one or more) of the component 102 of FIG. 1 may be manufactured, in which the first metal layer 106 is deposited (e.g., electroplated) on the polymeric material 104 and the second metal layer 108 is deposited on the first metal layer 106. The first thickness 132 of the first metal layer 106 and the second thickness 134 of the second metal layer 108 may be determined. For example, destructive measurement techniques, such as cutting the component 102 at one or more locations to create cross-sections, may be used to measure the thicknesses 132, 134. The measured thicknesses 134, 136 for the set of components 102 may be statistically analyzed to determine a mean, a standard deviation, and a range of acceptable thicknesses for each of the multiple layers 106, 108. For example, the range of acceptable thicknesses may be based on N*σ (where σ is the standard deviation of the measured thicknesses 132, 134 of the set of components 102 and N is a real number greater than 0). To illustrate, a hundred of the component 102 may be manufactured and the thicknesses 132, 134 measured to determine σ.

In some cases, a set (e.g., one or more) of the component 102 of FIG. 1 may be manufactured, in which the first metal layer 106 is deposited (e.g., electroplated) on the polymeric material 104 and the second metal layer 108 is deposited on the first metal layer 106. For each component 102 in the set of components, the resistance of the multiple metal layers may be measured at multiple locations. Because the equations described above indicate a relationship between the thickness of each metal layer and the combined resistance of the multiple metal layers, the thickness of each layer of the multiple layers may not be determined (e.g., estimated). Instead, after gathering a large set of resistance data for a set of the component 102, a statistical analysis of the resistance data may be performed to determine an acceptable range of resistances for each location where the resistance is measured. For example, based on the analysis, a mean+/− N*sigma (of resistance values) may be used as the control limit. The resistance of one or more layers may be measured after each layer has been deposited or after all the layers have been deposited. The advantage of this approach is that the thickness of each layer may not be determined. If one or more layers of the multiple layers are either too thin or too thick, the combined resistance at one or more locations where the resistance is measured may be outside the acceptable range of resistances. For example, if one or more layers of the multiple layers are too thin, the combined resistance at one or more locations may be below a minimum acceptable resistance. If one or more layers of the multiple layers are too thick, the combined resistance at one or more locations may be above a maximum acceptable resistance.

Furthermore, in some cases, a combined approach may be used in which the combined resistance of the multiple metal layers is measured at multiple locations. The thickness of individual layers may be determined at one or more of the locations (e.g., locations designated as critical to the structural integrity of the component) but not necessarily at a remainder of the locations where the combined resistance is measured.

Example Computing Device and Environment

Figure 12:
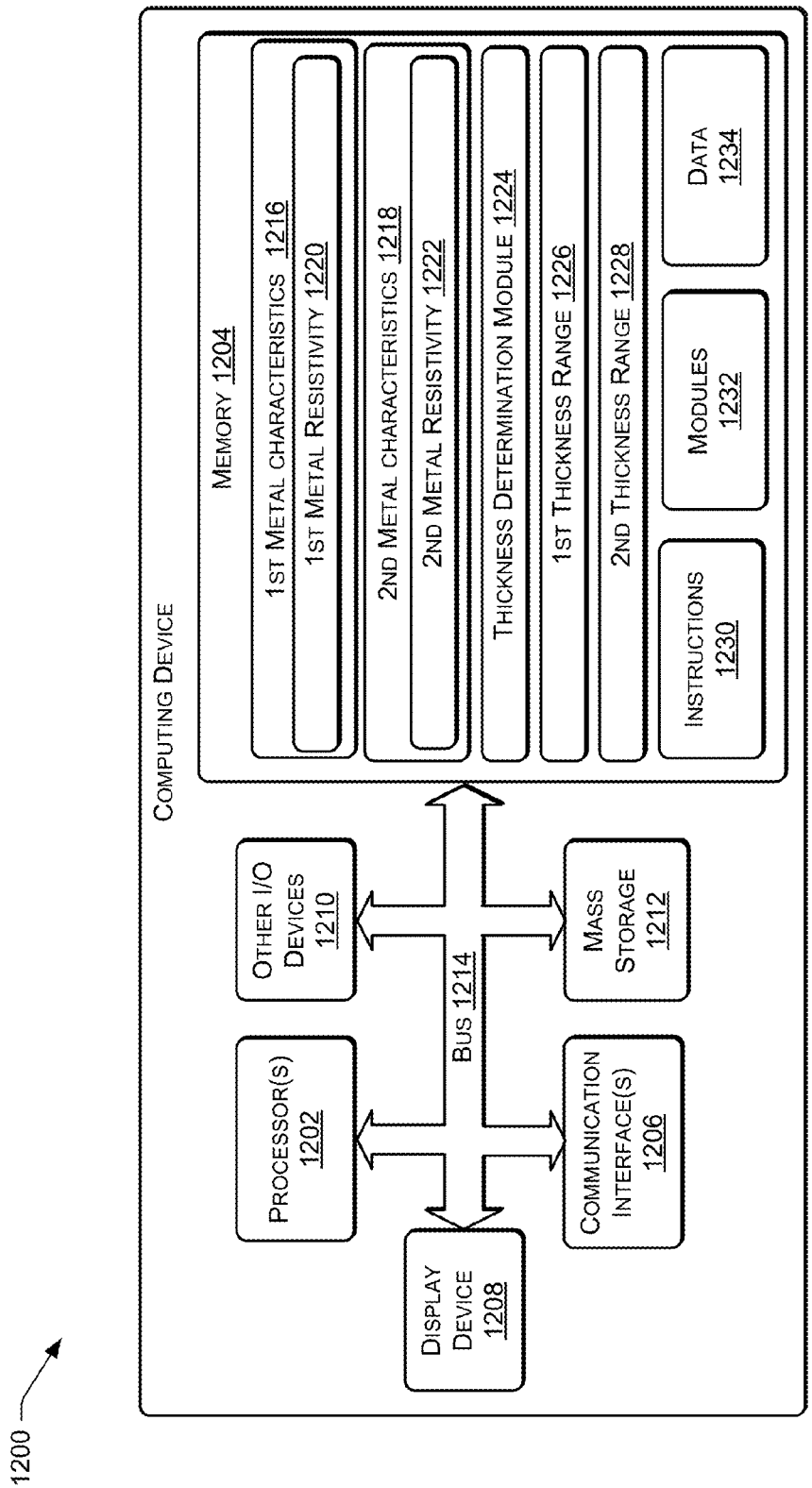
FIG. 12 is a block diagram of an example computing device and environment according to some implementations.

FIG. 12 illustrates an example configuration of a computing device 1200 and an environment that can be used to implement the modules and functions of the measurement device 114, the computing device 130, or both. The computing device 1200 may include at least one processor 1202, a memory 1204, communication interfaces 1206, a display device 108, other input/output (I/O) devices 1210, and one or more mass storage devices 1212, able to communicate with each other, such as via a system bus 1214 or other suitable connection.

The processor 1202 may be a single processing unit or a number of processing units, all of which may include single or multiple computing units or multiple cores. The processor 1202 can be implemented as one or more microprocessors, microcomputers, microcontrollers, digital signal processors, central processing units, state machines, logic circuitries, and/or any devices that manipulate signals based on operational instructions. Among other capabilities, the processor 1202 can be configured to fetch and execute computer-readable instructions stored in the memory 1204, mass storage devices 1212, or other computer-readable media.

Memory 1204 and mass storage devices 1212 are examples of non-transitory computer storage media for storing instructions which are executed by the processor 1202 to perform the various functions described above. For example, memory 1204 may generally include both volatile memory and non-volatile memory (e.g., RAM, ROM, or the like). Further, mass storage devices 1212 may generally include hard disk drives, solid-state drives, removable media, including external and removable drives, memory cards, flash memory, floppy disks, optical disks (e.g., CD, DVD), a storage array, a network attached storage, a storage area network, or the like.

The memory 1204 may be used to store software modules (e.g., instructions) to perform the various functions described herein and to store various data. For example, the memory 1204 may include first metal characteristics 116 associated with a first metal layer (e.g., the first metal layer 106 of FIG. 1) and second metal characteristics 1218 associated with a second metal layer (e.g., the second metal layer 108). To illustrate, the first metal characteristics 1216 may include a first metal resistivity 1220 associated with the first metal layer and the second metal characteristics 1218 may include a second metal resistivity 1222 associated with the second metal layer. A thickness determination module 1224 may be used to determine a thickness of individual metal layers based on a resistance measured by a measuring device. The computing device 1210 may determine whether a thickness of an individual metal layer (e.g., a first thickness of the first metal layer) is within a first thickness range 1226 and whether a thickness of an individual metal layer (e.g., a second thickness of the second metal layer) is within a second thickness range 1228. For example, the computing device 1210 may determine whether a copper layer has a thickness within a 5 to 10 micron range and whether a monocrystalline nickel layer has a thickness within a 25 and 30 micron range. The memory 1204 may include instructions 1230 and modules 1232 that are executable by the processors 1202 to perform the various functions described herein. The memory 1204 may include data 1234 that is determined when using equations to determine a thickness of individual metal layers based on a measured resistance of multiple metal layers.

Figure 13:
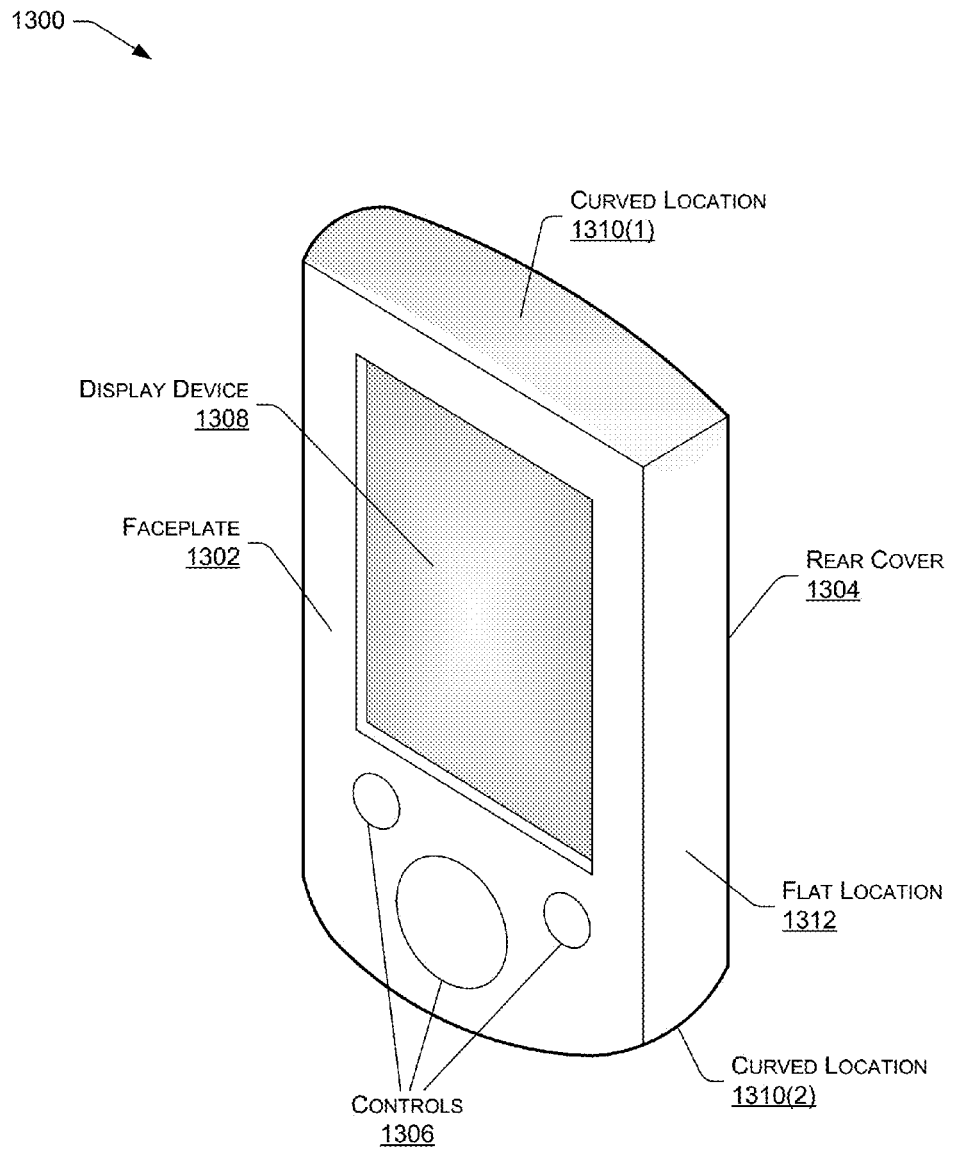
FIG. 13 is a block diagram of a device assembled using a plurality of components according to some implementations.

FIG. 13 is a block diagram of a device 1300 assembled using a plurality of components according to some implementations. The device 1300 may be assembled by fitting a faceplate 1302 to a rear cover 1304. For example, the faceplate 1302 or the rear cover 1304 may comprise the component 102 of FIG. 1. The faceplate 1302 may include cutouts for one or more controls 1306. For example, the controls 1306 may be included on a circuit board that is placed between the rear cover 1304 and the faceplate 1302. The faceplate 1302 may include a cutout for a display device 1308.

The rear cover 1304 (e.g., the component 102) may include one or more relatively curved locations 1310(1) and 1310(2) and at least one relatively flat location 1312. The curved locations 1310 may include a convex location, a concave location, or both. When one or more of the dimensions of the rear cover 1304 vary by at least a predetermined amount at a particular location, the particular location may be referred to as relatively curved. When one or more of the dimensions of the rear cover 1304 vary by less than the predetermined amount at a particular location, the particular location may be referred to as relatively flat.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   placing a measurement device on a component comprising a plurality of metal layers including a first metal layer deposited on a polymeric material and a second metal layer deposited on the first metal layer, wherein a first probe and a second probe of the measurement device is in contact with the second metal layer;
   applying a current to the plurality of metal layers via the first probe and the second probe;
   determining a combined resistance of the plurality of metal layers between the first probe and the second probe of the measurement device;
   determining a first thickness of the first metal layer by dividing the combined resistance by a first resistivity of the first metal layer;
   calculating a second thickness of the second metal layer by dividing the combined resistance by a second resistivity of the second metal layer;
   determining that the first thickness of the first metal layer satisfies a first threshold;
   determining that the second thickness of the second metal layer satisfies a second threshold; and
   indicating that the component has passed a quality control test.

2. The method of claim 1, wherein a combined thickness of the plurality of metal layers is at least 20 microns.

3. The method of claim 1, wherein the plurality of metal layers include copper or nickel.

4. The method of claim 1, further comprising:
   determining a second combined resistance of a second plurality of metal layers of a second component;
   determining that at least a third thickness of a third metal layer of the second plurality of metal layers fails to satisfy at least one of the first threshold or the second threshold; and
   indicating that the second component has failed the quality control test.

5. A measurement device comprising:
   one or more processors;
   one or more non-transitory computer-readable media storing instructions that are executable by the one or more processors to:
      determine, at a first location of a component, a first combined resistance of a plurality of metal layers, wherein the plurality of metal layers comprise a first metal layer disposed on a polymer material of the component and a second metal layer disposed on the first metal layer;

determine a first thickness of the first metal layer at the first location based at least partly on the first combined resistance and a first resistivity associated with the first metal layer;

determine a second thickness of the second metal layer at the first location based at least partly on the first combined resistance and a second resistivity associated with the second metal layer;

determine that the first thickness is within a first thickness range;

determine that the second thickness is within a second thickness range; and provide an indication that the component has passed a quality control test.

6. The measurement device of claim 5, wherein the instructions are further executable by the one or more processors to:

determine, at a second location of the component, a second combined resistance of the plurality of metal layers deposited on the polymer material of the component.

7. The measurement device of claim 6, wherein the instructions are further executable by the one or more processors to:

determine a third thickness of the first metal layer at the second location based at least partly on the second combined resistance and the first resistivity; and determine that the third thickness is within a third thickness range.

8. The measurement device of claim 6, wherein the instructions are further executable by the one or more processors to:

determine a fourth thickness of the second metal layer at the second location based at least partly on the second combined resistance and the second resistivity; and determine that the fourth thickness is within a fourth thickness range.

9. The measurement device of claim 5, further comprising:

a first electrically conductive probe, a second electrically conductive probe, a third electrically conductive probe, and a fourth electrically conductive probe; and wherein to determine the first combined resistance of the plurality of metal layers:

the first electrically conductive probe and the second electrically conductive probe are placed in contact with the second metal layer at the first location;

a current is applied between the first electrically conductive probe and the second electrically conductive probe;

a voltage drop between the third electrically conductive probe and the fourth electrically conductive probe is measured, wherein the third electrically conductive probe and the fourth electrically conductive probe are in contact with the second metal layer at the first location; and the first combined resistance of the plurality of metal layers is determined at the first location based at least partly on the voltage drop.

10. The measurement device of claim 9, wherein a spacing between the third electrically conductive probe and the fourth electrically conductive probe is greater than either the first thickness of the first metal layer at the first location or the second thickness of the second metal layer at the first location.

11. The measurement device of claim 9, wherein a weight is placed on the measurement device to place the first electrically conductive probe and the second electrically conductive probe in electrical contact with the second metal layer at the first location.

12. A computer-implemented method, comprising:

determining, by a first measurement device at a first location of a component, a first combined resistance of a plurality of metal layers including a first layer disposed on a polymer plastic core of the component and a second layer disposed on top of the first layer;

determining a first set of thicknesses based at least partly on the first combined resistance and a resistivity of individual layers of the plurality of metal layers, wherein individual thicknesses of the first set of thicknesses correspond to individual layers of the plurality of metal layers at the first location;

determining that the individual thicknesses of the first set of thicknesses satisfy individual thickness ranges; and indicating that the first set of thicknesses pass a first quality control test.

13. The computer-implemented method of claim 12, wherein determining, at the first location of the component, the first combined resistance of the plurality of metal layers comprises:

determining, by a first measurement device, a first voltage drop across the plurality of metal layers at the first location of the component; and determining the first combined resistance based at least partly on the first voltage drop.

14. The computer-implemented method of claim 13, further comprising:

determining, by a second measurement device, a second combined resistance of the plurality of metal layers at a second location of the component; and determining a second set of thicknesses based at least partly on the second combined resistance and a resistivity of the individual layers of the plurality of metal layers.

15. The computer-implemented method of claim 14, wherein:

the first location comprises a flat portion of the component; and the second location comprises a curved portion of the component.

16. The computer-implemented method of claim 14, further comprising:

selecting, by a multiplexer, the first measurement device; and selecting, by the multiplexer, the second measurement device.

17. The computer-implemented method of claim 12, wherein the first set of thicknesses include:

a first thickness of the first layer at the first location; and a second thickness of the second layer at the first location.

18. The computer-implemented method of claim 12, wherein a combined thickness of the plurality of metal layers is at least 20 microns.

19. The computer-implemented method of claim 12, wherein:

the first layer includes copper; and the second layer includes nickel.

20. The computer-implemented method of claim 12, further comprising:

spraying, by a nozzle, a gas mixture for a predetermined period of time at the first location of the component to dry an outer layer of the plurality of metal layers.

* * * * *